Jan. 5, 1932.  H. E. TWOMLEY  1,839,620
FRUIT BOX STRAPPING MACHINE.
Filed May 12, 1931  4 Sheets-Sheet 4
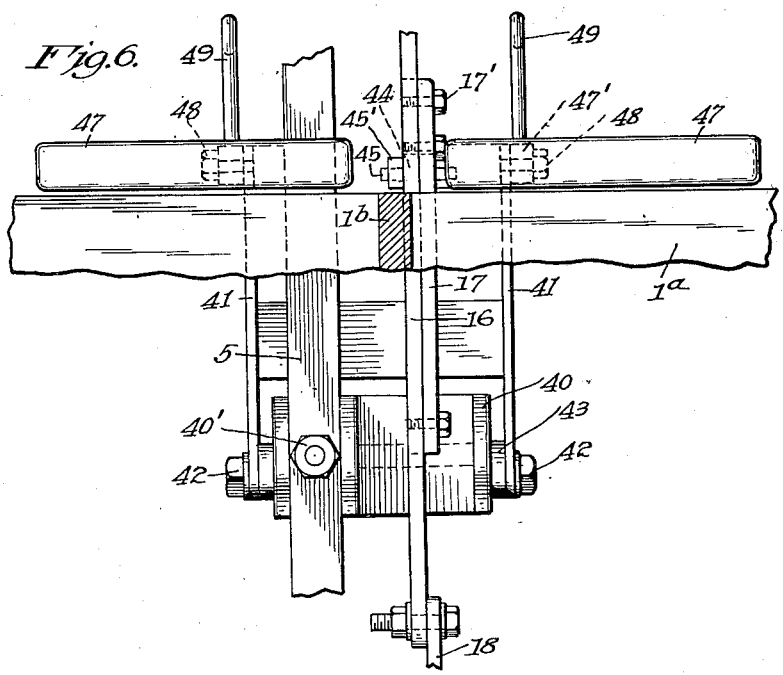
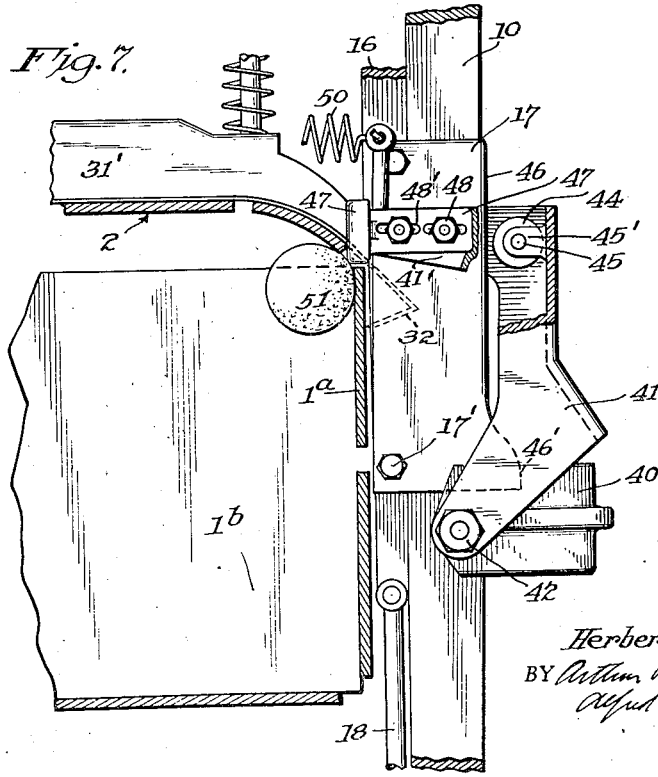
INVENTOR.
Herbert E. Twomley,
BY
ATTORNEYS.

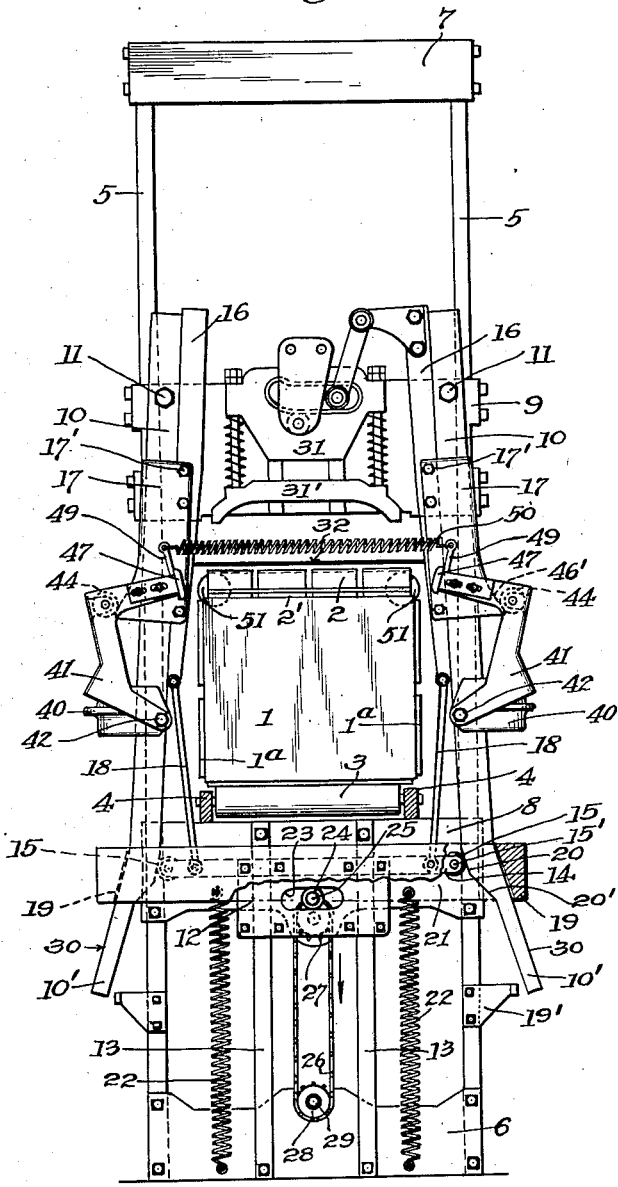

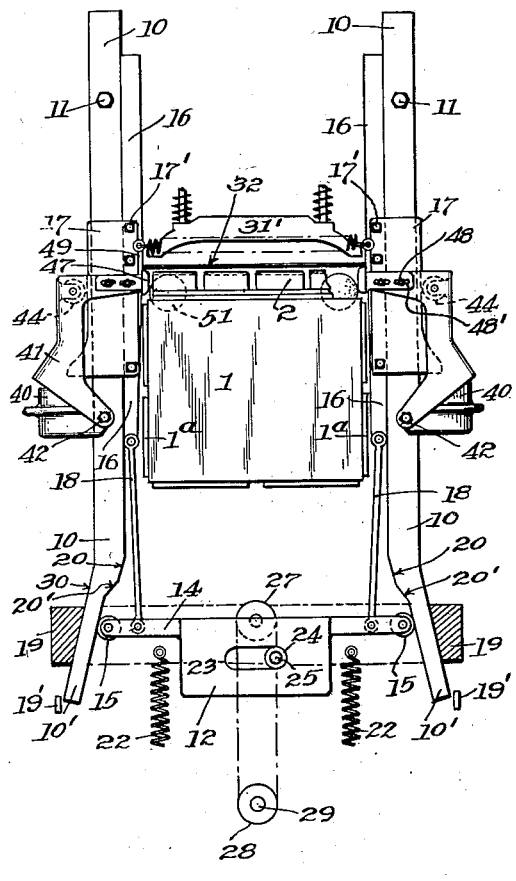

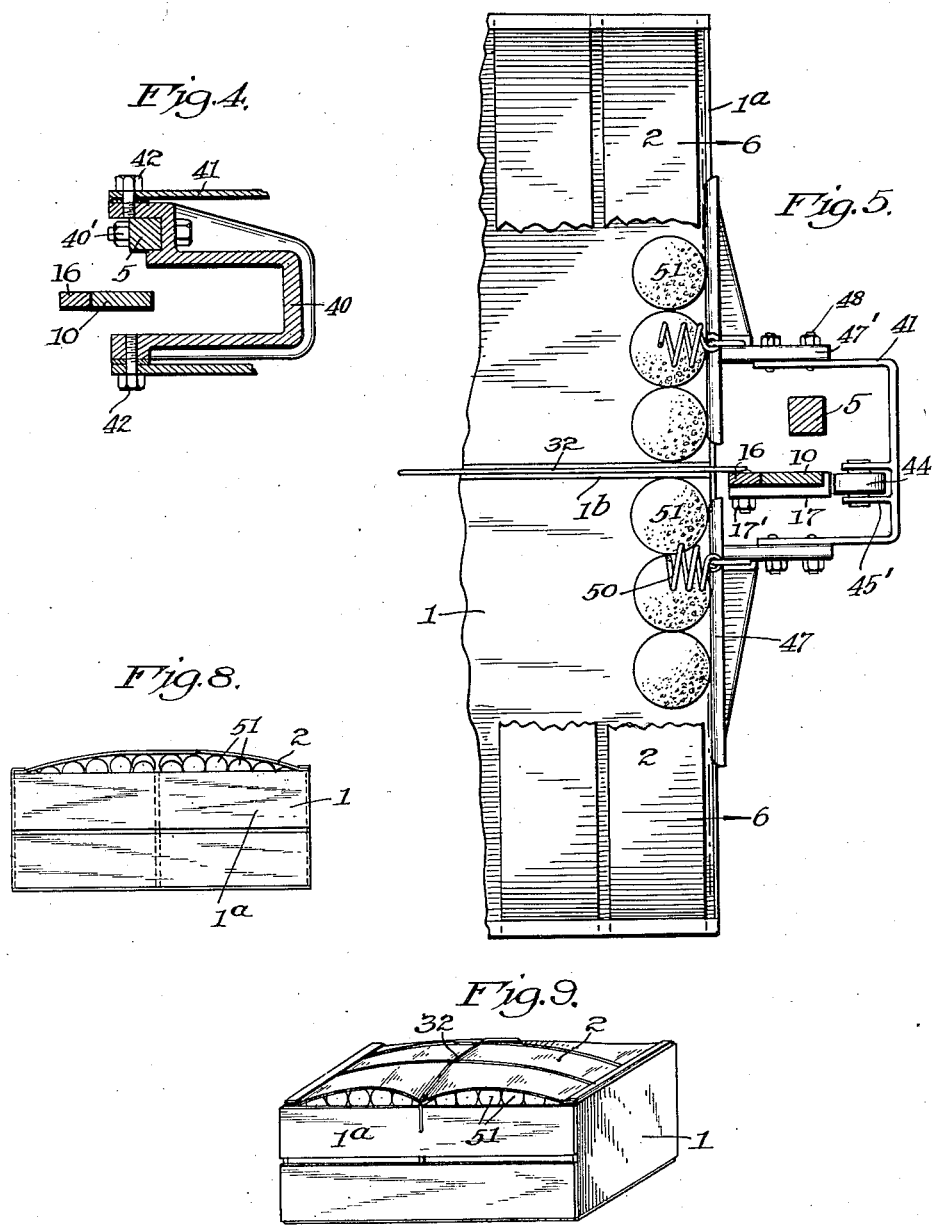

Patented Jan. 5, 1932

1,839,620

UNITED STATES PATENT OFFICE

HERBERT E. TWOMLEY, OF RIVERSIDE, CALIFORNIA, ASSIGNOR TO THE ESTATE OF GEORGE D. PARKER; CLARA B. PARKER, EXECUTRIX, OF RIVERSIDE, CALIFORNIA

FRUIT BOX STRAPPING MACHINE

Application filed May 12, 1931. Serial No. 536,816.

This invention relates to the art of applying box straps to containers, and particularly to side fruit flushing means for a box strap applying machine which provides for compressing protruding fruit inward and beyond the inner edge of the box side while said machine compresses and forms the cover of said box during the application of said strap to said box, substantially eliminating damage to said fruit due to pinching between the cover and the sides of said box during the strapping operation.

The invention specifically relates to an improvement on a machine for applying box straps to containers patented by George D. Parker, October 7, 1930, United States Letters Patent No. 1,777,474. The operation of this machine was clearly disclosed in the above patent and will not be completely described in this application.

As the above mentioned machine was adopted and used by a number of packing houses, it developed that certain sizes of fruit were subject to damage by the cover of the box in which they were packed, as said cover was formed into place by said machine and a box strap applied thereto.

Improvised flushing means have been tried for the purpose of preventing damage to the fruit during the strapping operation, but have failed to provide sufficient lateral movement of the flushing means to force the fruit clearly in and completely clear of the sides of the box and to withdraw far enough to admit of free movement of boxes of fruit into and out of the strapping machine. They have also not been adapted to operate at a sufficiently early stage in the operation of the strapping machine, and have thus failed to press the fruit in under the cover of the box until after considerable force had been applied to the cover by the cover forming shoe of the strapping machine, and complete prevention of damage to the fruit was therefore not realized.

The principal object of the present invention is to provide means to automatically force the fruit inwardly under the cover of the box and beyond the inner edge of the box side, in timed relation to the operating mechanism of the strapping machine and before any downward pressure is applied to the box cover to form same over the fruit in said box, to hold said fruit in said position during the fastening of the box strap to said box, and to withdraw from said box, after the fastening operation, substantially out of the line of travel of said box through the strapping machine and out of contact with any part protruding from the sides of an incoming packed box.

A further object of the invention is to provide side fruit flushing means on each side of a fruit box in strapping position consisting of pressure plates extending longitudinally of the box which are laterally movable inwardly to and past the inside edge of the box side wall, said pressure plates being provided with a lateral movement greater than that of the guide bars by whose movement their operation is controlled, whereby said pressure plates may be moved inwardly to such a degree that the fruit in the upper layer is compressed to a position substantially out of contact with the side walls of the box, and which may be moved outwardly to such a position that the box, including any protruding fruit, is free to pass through the machine, into and out of strapping position, without contact therewith.

A further object of the invention is to provide side fruit flushing means movable inwardly against the fruit by means of gentle yielding springs whereby possible damage to said fruit by excessive pressure thereon is eliminated.

A further object of the invention is to provide side fruit flushing means which does not in any way impair the perfect functioning of the strapping mechanism to which it is attached.

The present invention comprises means for flushing the upper layer of fruit packed in a box previous to and during the forming and strapping of a cover to said box and comprises,—in combination with a strapping machine having means for positioning and holding a box for strapping, and strapping and cover-forming means for compressing said cover over said fruit and for securing a strap cross-wise to and substantially centrally of said fruit box,—flushing means positioned on said strapping means each side of said box, extending longitudinally of said box each side of the position of application of the strap, and adapted to compress inwardly any top layer fruit in contact with the upper edge of the box sides to such a point that said fruit is removed from possible contact with said box sides before the cover is formed downwardly upon said fruit by the strapping mechanism. The invention comprises particularly a pair of pressure plate arms pivotally mounted upon the fixed upright members of the box strapping machine, one on each side of said box, and adapted to move inwardly of said fixed upright members, means for effecting said inward movement of said arms upon the downward operation of the strapping mechanism and before said strapping mechanism contacts the cover of said box, and pressure plates disposed on said pressure plate arms in position to contact and compress the top layer of fruit inwardly away from the sides of said box upon said inward movement of the pressure plate arms. Said means for effecting the inward movement of said pressure plate arms preferably comprises springs so disposed as to provide a yielding inward pressure of said pressure plates upon said fruit.

The apparatus of this invention has been developed particularly for use in the strapping of packed boxes of citrus fruit, but it will be understood that it may also be used in connection with other kinds of fruit or in general, any goods which are boxed and strapped in a similar manner and in which there is danger of damage to the goods in the box during the compression of the cover incident to the strapping operation.

In the accompanying drawings, forming a part of this application, there is shown a side fruit flushing mechanism according to my invention, as applied to a type of box strapping machine substantially as described in the above mentioned Patent No. 1,777,474, and referring thereto:

Fig. 1 is a partly sectional end elevation thereof, with a packed and covered fruit box shown in end elevation in position to be strapped;

Fig 2 is a view similar to the above, showing the flushing mechanism in complete flushing position;

Fig 3 is a view similar to the above, showing the completion of the strapping operation, with the flusher mechanism remaining in complete flushing position, the box of fruit being shown in section;

Fig. 4 is a sectional detail of one of the pressure plate arm supporting brackets on line 4—4 on Fig. 3;

Fig. 5 is a plan view of one side of the side fruit flusher mechanism on line 5—5 in Fig. 3;

Fig. 6 is a vertical view of the same on line 6—6 in Fig. 5;

Fig. 7 is an enlarged end elevation of one side of the flusher mechanism in operated position as shown in Fig. 3;

Fig. 8 is a side elevation of a box of fruit with the cover nailed on at the ends and before the strapping thereof;

Fig. 9 is a perspective view of a box of fruit after the strapping operation.

Referring to Figs. 1 to 7, a packed fruit box 1, having a cover 2 nailed thereto at the ends as at 2′ is shown in position to be strapped by the strapping machine which comprises a plurality of conveyor rolls 3 supporting said box, said rolls being journaled in the parallel table rails 4 providing a suitable roller conveyor structure over which the box 1 is conveyed on the machine during operation. Two central upright frame members 5 comprising part of the structure of the strapping machine are connected at their lower ends by floor frame tie member 6 and at their upper ends by upper frame tie 7. Said central uprights are also connected at their intermediate ends by table frame tie member 8 and frame tie 9. The table rails 4 are supported in any suitable manner, for example as shown in said patent.

Guide bars 10, provided with angularly projecting lower ends 10′, are pivotally disposed on frame tie 9 by means of pins 11 in such a manner as to be adapted to swing laterally toward the box 1 upon the downward movement of crosshead 12 disposed on guide bars 13 secured to floor frame tie 6 and table frame tie 8, said crosshead 12 being provided with a cross member 14 provided at each end with a roller 15 engaging the inner faces of the projecting ends 10′ of the guide bars 10, said rollers being free to turn on the pins 15′. The inner faces 20 of the projected ends 10′ of the guide bars 10 are formed as shown in Fig. 1, having portions 20′ inclined downwardly and outwardly at a considerable angle to the vertical, so that upon the downward movement of the crosshead 12 the guide bars are allowed to move inward quickly, providing an early positioning engagement of drive bars 16 with the box sides 1a and for additional reasons as will be subsequently pointed out. The above mentioned drive bars 16 are positioned along the inner faces of the guide bars 10 and slidably secured thereto by means of cam gibs 17, said gibs being bolted to said drive bars by means of screws or bolts 17′ and extending alongside and behind said guide bars. The drive wedges and stop plates mounted on the drive bars as shown in said patent, but omitted from the accompanying drawings as they play no part in the present invention, also assist in slidably retaining the drive bars in position on the guide bars.

Drive bars 16 are provided with connecting rods 18 pivotally secured thereto at the lower ends thereof and pivotally secured to the cross member 14 of the crosshead 12, whereby upon the downward movement of said crosshead said drive bars are pulled downwardly along the guide bars 10. Gibs 19 are provided which are adapted to slide on the downwardly and outwardly inclined outer faces 30 of the projecting ends 10' of the guide bars 10, said gibs being carried by the lock bar 21 positioned below the table rails 4 of the roller conveyor. This lock bar is adapted for limited sliding movement to operate the gibs along the inclined faces 30 of the projections 10' so that the guide bars are moved laterally on their pivots 11. Suitable coil springs 22, normally under tension, are provided, anchored at one end to the lock bar 21 and at the other end to the floor frame tie 6 at each side of the machine as shown in Fig. 1, and serve by depressing said gibs 19 to force the ends 10' of the guide bars 10 inwardly upon the downward movement of the crosshead 12. Stops 19' secured to the upright members 5 are provided for limiting the downward movement of the gibs 19. Said stops may be positioned either in front of or behind the plane of operation of guide bars 10 so as not to interfere with the movement thereof. The crosshead 12 is formed with a horizontal slot 23 adapted to receive the stud 24 on the special link 25 of the drive chain 26 mounted over the drive sprocket 27, which is suitably and rotatably mounted on the table frame member 8, and over a lower sprocket 28 which is rotatably disposed upon the shaft 29 suitably mounted on the floor frame tie 6. The drive sprocket 27 is provided with suitable driving means for operation of the machine, as shown in the above mentioned patent.

The box strapping machine is provided with a press-shoe operating mechanism 31 supported on the frame tie 9, said press-shoe mechanism providing for the depression of the press-shoe 31' downwardly upon the box cover 2 upon the downward movement of the drive bars 16, as set forth in the above mentioned patent. A strap supply and feeding device is also provided for delivering and positioning straps 32 above the cover 2 and below the press-shoe 31', and the drive bars 16 are also provided with suitable wedge devices for stretching and clamping the strap on the box in conjunction with press-shoe 31' as set forth in the above patent.

The side fruit flushing mechanism of the present invention comprises particularly a fulcrum bracket 40 at each side of the machine, rigidly secured to the respective upright members 5 in any suitable manner as, for example, by means of bolts 40', each of said brackets being preferably of U shape to provide clearance for the lateral movement of the guide bars 10 and for the downward movement of the cam gib 17, pressure plate arms 41 rotatably disposed on pins 42 secured to the respective brackets 40 at the hub or boss portion 43 at each side of the position of the guide bars and drive bars, as shown in Fig. 4, and rollers 44 rotatably disposed on pins 45 in roller hangers 45' on the respective arms 41 and adapted to contact the cam surface 46 of the cam gib 17. Said cam surface is provided with a downwardly and outwardly inclined lower portion 46'. The pressure plate arms are provided at their upper ends with inward extensions 41' disposed at the opposite sides of the guide bars and drive bars, and pressure plates 47 are mounted on said inward extensions. Said pressure plates are shown as provided with outwardly extending portions 47' secured to said inward extensions in any suitable manner which will preferably allow of adjustment of said pressure plates as, for example by means of bolts or screws 48 extending through slots 48' in the pressure plates into the inward extensions 41'. The pressure plates 47 are provided with extension eye-bolts 49 into which are inserted the ends of the coiled springs 50 which maintain a pull upon opposing pressure plates, tending to force the same inwardly whereby a yielding pressure is applied to the fruit when the cam gibs 17 release the pressure plate arms 41, as shown in Fig. 2.

The operation of the above described apparatus is substantially as follows: Upon the driving mechanism being set in operation, the crosshead 12 moves downward, carried by the drive chain 26 around the sprockets 27 and 28, carrying with it the cross bar 14 and the rollers 15, the connecting rods 18, the drive bars 16 and the thereto attached cam gib 17, and at the same time the guide bars are pressed inwardly by gibs 19 drawn downwardly by springs 22 as rollers 15 are drawn downwardly until the drive bars 16 are in contact with the sides of the box 1, which provides for the lateral positioning and holding of said box on the conveyor rolls 3. As the lower extended cam portion of the cam gib 17 moves downward the pressure plate arms are allowed to be pulled inwardly by the coiled springs 50 thereby compressing the protruding fruit 51 (Fig. 1) substantially under the cover 2 and away from the sides of the box as shown in Fig. 2. The object in changing the shape of the inner faces of the guide bar projections 10' from the shape shown in the above mentioned patent is to provide for a more rapid inward movement of the guide bars as the rollers 15 move downwardly whereby the cam gib 17 is moved inwardly very soon after the start of the downward movement thereof and the pressure plates are thus permitted to be pulled inwardly by the coil springs so as to compress the fruit away from the sides of the box before the press-shoe 31' is forced into contact with the cover of the box. The press-shoe is moved downwardly upon the box cover by the downward movement of the drive bars 16, said drive bars being drawn along the side of the box to provide for the action of the above mentioned wedge devices whereby the strap 32 is forced into the sides of the box and into the central transverse partition 1b separating the box into two compartments.

The pressure plates are allowed to compress the fruit inwardly before and during the compression and forming of the box cover and while the strap is being secured in place, said pressure plates releasing the fruit after the pressure on the cover is released by the press-shoe 31' and when the crosshead is practically completely returned to the uppermost position by further travel of the chain 26.

Fig. 1 illustrates the apparatus with the crosshead in the uppermost position and the flushing mechanism withdrawn clear of the box of fruit, the protruding fruit being shown at 51 and the box in position to be strapped.

Fig. 2 illustrates the apparatus with the crosshead partially lowered and the side flushing mechanism released by the cam gib 17 so that the pressure plates have forced the fruit inwardly substantially under the cover 2 and away from the sides 1a of the box 1. The press-shoe has still some distance to travel before coming in contact with the cover 2.

Fig. 3 illustrates the apparatus with the crosshead progressed to a lower position, the press-shoe in contact with the cover, compressing and forming the same over the fruit which has been held away from the sides of the box and completely protected from damage by pinching between the cover and the sides of the box.

Further lowering of the crosshead 12 to the position shown in dotted lines at A in Fig. 3 serves to complete the strapping operation, substantially as described in said Patent No. 1,777,474, and the drive chain thereafter returns the same to the top, whereupon side pressure of the drive bars on the box is relieved and the flushing mechanism is withdrawn to the position shown in Fig. 1 due to engagement of cam gibs 17 with rollers 44, and the box may then be withdrawn from the machine and the operation repeated on the next box.

A comparison of Fig. 8 showing an unstrapped packed fruit box 1 having a cover nailed thereon at the ends, with Fig. 9 showing the same box after the strapping operation, will provide some idea of the compression and forming of the box cover over the central edge portions of the top layer of fruit.

If a box having the top layer of fruit protruding from the box as shown at 51 in Fig. 1 and Fig. 8 were strapped without providing a flushing of the central edge portions of the top layer of fruit, an appreciable number of such fruit would be certain to suffer damage by being pinched btween the box cover 2 and the box sides 1a as the said cover is forced downwardly upon the fruit, in the cover forming and strapping operation, to the position shown in Fig. 9.

The operation of the above described flushing mechanism does not in any way interfere with the operation of the strapping machine and does not require additional operating energy. Some improvised forms of side fruit flushing devices have provided pressure plates attached to the guide bars which were forced inwardly by the movement of the guide bars. In addition to occasionally damaging the fruit by the application of positive pressure in this manner, the pressure exerted by the guide bars in forcing the fruit inwardly detracts from the holding and positioning pressure which the guide bars are capable of exerting upon the sides of the box through the drive bars, and additional pressure upon the projecting ends 10' of the guide bars is necessary to properly drive the ends of the straps into the sides of the box and central partition. The flushing apparatus of the present invention does not require any energy from the driving mechanism during the downward operation of the machine, as the force necessary to produce an inward movement of the pressure plates is derived solely from the coil springs 50, said springs being forcibly extended during the upward movement of the drive mechanism, at which time there is power to spare.

I claim:

1. In combination with a fruit box strapping machine having means for supporting a packed and covered box in strapping position and means for compressing the central edge portions of the cover and for securing a strap crosswise of said box over the compressed cover, a side fruit flushing device comprising pressure plates extending longitudinally each side of said box and at each side of the transverse center line thereof when in strapping position and movable outwardly to a position beyond the outer extremities of said packed box and inwardly beyond the inner faces of the box sides and means operable to move said pressure plates inwardly and outwardly between said two positions without affecting the operation of the box strapping machine.

2. In combination with a fruit box strapping machine having means for supporting a packed and covered box in strapping position and means for compressing the central edge portions of the cover and for securing a strap crosswise of said box over the compressed cover and means for operating said compressing and strap securing means, a side fruit flushing device comprising pressure plates extending longitudinally each side of said box and at each side of the transverse center line thereof when in strapping position and movable outwardly to a position beyond the outer extremities of said packed box and inwardly beyond the inner faces of the box sides and means controlled by the movement of said operating means to move said pressure plates inwardly prior to the operation of said cover compressing and strap securing means.

3. In combination with a fruit box strapping machine having means for supporting a packed and covered box in strapping position and means for compressing the central edge portions of the cover and for securing a strap crosswise of said box over the compressed cover and driving means for operating said compressing and strap securing means, a side fruit flushing device comprising pressure plates extending longitudinally each side of said box and at each side of the transverse center line thereof when in strapping position and movable outwardly to a position beyond the outer extremities of said packed box and inwardly beyond the inner faces of the box sides, actuating means independent of said driving means operable to move said pressure plates inwardly from said first named position, and means operable by said driving means for controlling and timing the inward movement of said pressure plates by said actuating means.

4. The combination as set forth in claim 3, wherein said actuating means comprises resilient means tending to move said pressure plates inwardly from said first named position.

5. In combination with a fruit box strapping machine having means for supporting a packed and covered box in strapping position and means for compressing the central edge portions of the cover and for securing a strap crosswise of said box over the compressed cover and means for moving said compressing and strap securing means into and out of operative position, a side fruit flushing device comprising pressure plates extending longitudinally each side of said box and at each side of the transverse center line thereof when in strapping position and movable outwardly to a position beyond the outer extremities of said packed box and inwardly beyond the inner faces of the box sides, actuating means tending to move said pressure plates inwardly from said first named position to said last named position, cam means normally holding said pressure plates in the first named position and operable upon movement of said cover compressing and strap securing means toward operative position to permit inward movement of the pressure plates to said last named position and operable upon movement of said cover compressing and strap securing means away from operative position to cause return of said pressure plates to said first named position.

6. A side fruit flushing device for a box strapping machine having a drive bar mounted to swing inwardly and outwardly and to also slide downwardly and upwardly; said flushing device comprising pressure plate means extending longitudinally of the position of a box in said machine and movable inwardly and outwardly with respect to a side of said box, means tending to move said pressure plate means inwardly, and cam means adapted to be mounted on said drive bar for movement therewith, said cam means engaging said pressure plate means to move the same outwardly upon outward and upward movement of said drive bar and withdrawing from such engagement so as to permit inward movement of said pressure plate means upon inward and downward movement of said drive bar.

In testimony whereof I have hereunto subscribed my name this 30th day of April, 1931.

HERBERT E. TWOMLEY.